Dec. 11, 1934.  F. E. LEWIS  1,983,940

COLLECTOR CONTROL SYSTEM

Filed May 12, 1927  5 Sheets-Sheet 1

WITNESSES:
H. T. Procter
H. W. Mattingly

INVENTOR
Frank E. Lewis
BY
Wesley G. Carr
ATTORNEY

Dec. 11, 1934.    F. E. LEWIS    1,983,940
COLLECTOR CONTROL SYSTEM
Filed May 12, 1927    5 Sheets-Sheet 2

WITNESSES:

INVENTOR
Frank E. Lewis
BY
ATTORNEY

Dec. 11, 1934.  F. E. LEWIS  1,983,940
COLLECTOR CONTROL SYSTEM
Filed May 12, 1927   5 Sheets-Sheet 4
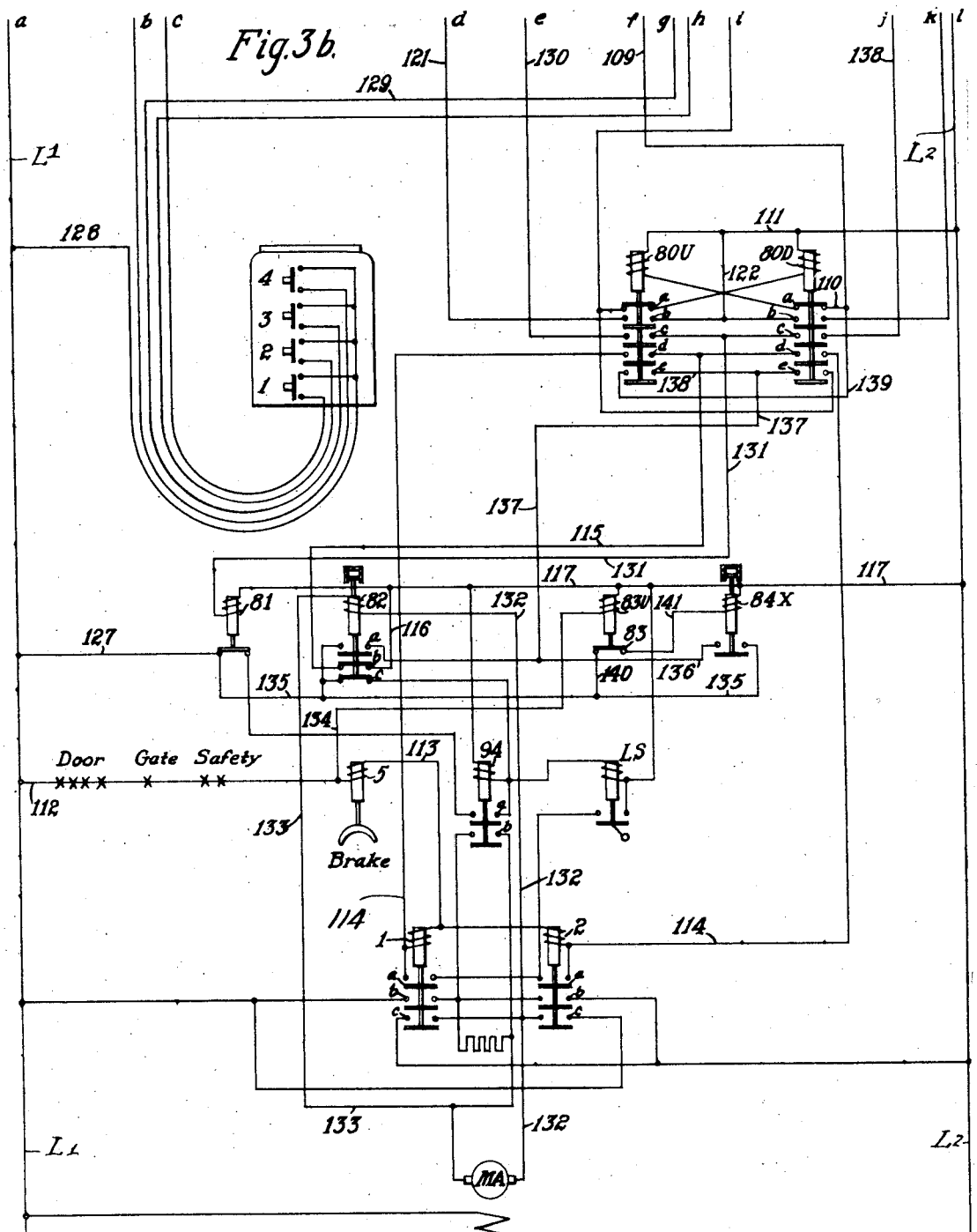
WITNESSES:
H. J. Procter
H. W. Mattingly
INVENTOR
Frank E. Lewis
BY
Wesley G. Carr
ATTORNEY Dec. 11, 1934.　　　　　F. E. LEWIS　　　　　1,983,940
COLLECTOR CONTROL SYSTEM
Filed May 12, 1927　　　5 Sheets-Sheet 5
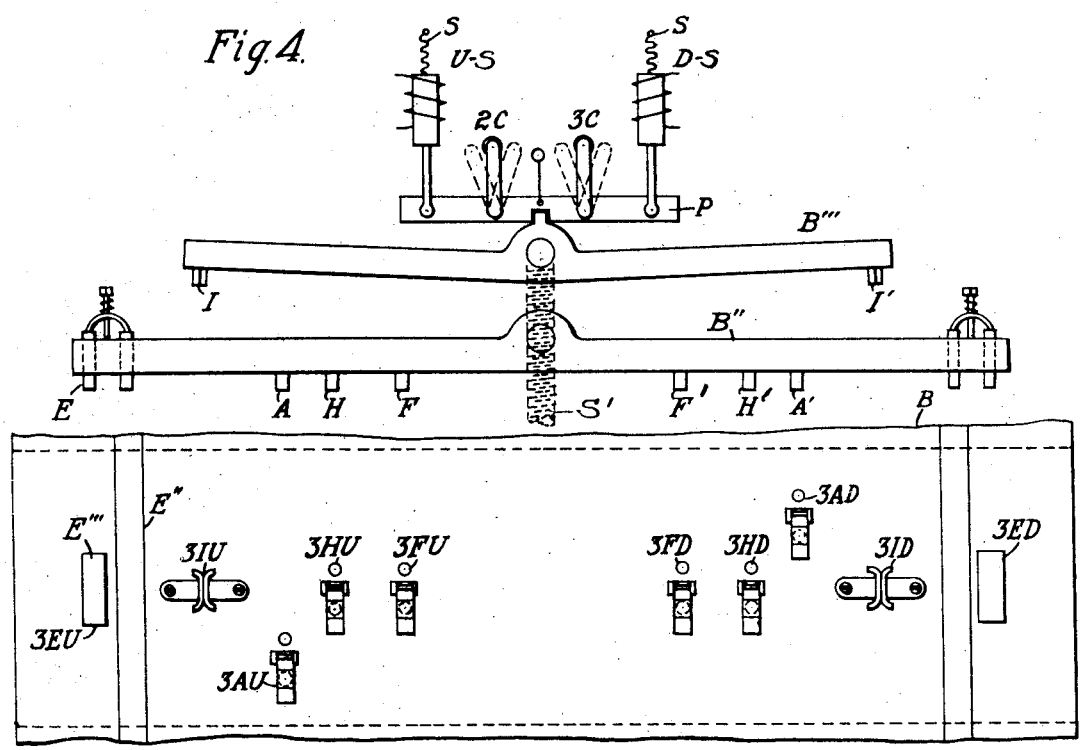
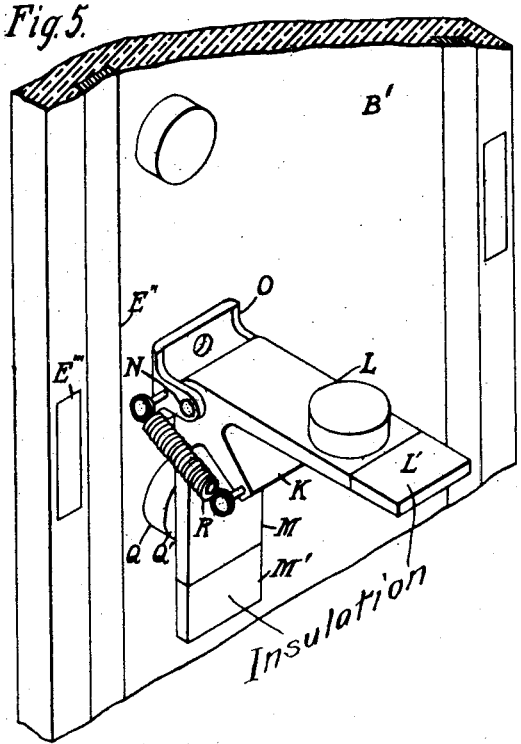
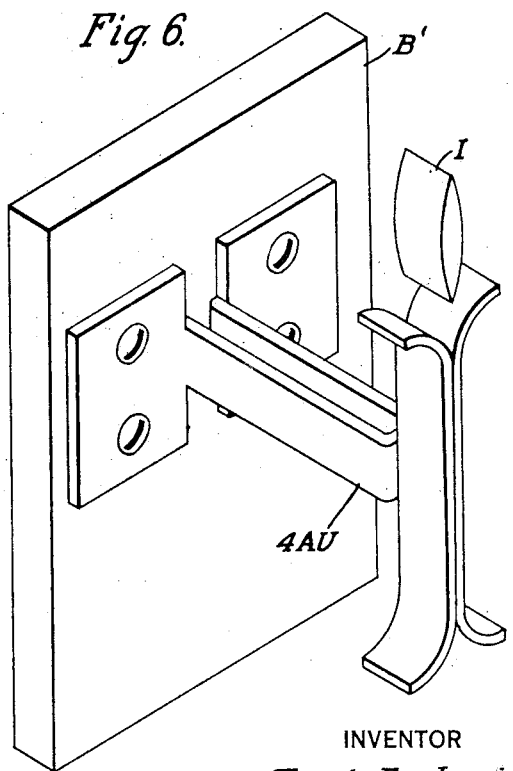
WITNESSES:　　　　　　　　　　　　　　　　INVENTOR
H. J. Procter　　　　　　　　　　　　　　　Frank E. Lewis
H. W. Mattingly　　　　　　　　　　　　　　BY Wesley G. Carr
　　　　　　　　　　　　　　　　　　　　　　　ATTORNEY Patented Dec. 11, 1934

1,983,940

UNITED STATES PATENT OFFICE 1,983,940

COLLECTOR CONTROL SYSTEM

Frank E. Lewis, East Pittsburgh, Pa., assignor to Westinghouse Electric & Manufacturing Company, a corporation of Pennsylvania Application May 12, 1927, Serial No. 190,780

9 Claims. (Cl. 187—29)

My invention relates to systems of control and has particular relation to systems employed in connection with elevators, hoists and similar machines.

One object of my invention is to provide a system of control for elevators which is entirely automatic in its operation, the elevator being controlled by the passengers, thus dispensing with the services of an attendant on the car.

Another object of my invention is to provide a control system for push-button controlled elevators, wherein the elevator will render a more efficient service than with systems heretofore known.

Another object of my invention is to provide a control system for elevators, in which the elevator will be caused to respond to calls initiated by persons desiring to use the elevator and which will cause the elevator to successively stop, in the natural order of the floors, at the floors for which calls have been operated, to take on passengers desiring to travel in the direction in which the elevator is then moving.

Another object of my invention is to provide a control system for elevators wherein the car is automatically moved to the various floors, in response to the operation of mechanism operable by persons desiring to use the car, in the exact manner of systems of the type wherein the car is controlled by an attendant on the car.

Another object of my invention is to provide a control system for elevators wherein the buttons are operative to call the car at all times regardless of whether the car is responding to another operated button, regardless of the direction in which the car is traveling and regardless of whether the car is moving or standing still at the time such buttons are operated.

Other objects of my invention will be apparent from the following description and the claims appended thereto.

My invention will be described with reference to the accompanying drawings in which, Figure 1 is a schematic diagram of my control system for an elevator serving four floors, showing the car controlled by inductor relays in the hatchway;

Fig. 2 is a schematic diagram of my control system similar to Fig. 1, but using a floor selector in place of the inductor relays;

Figs. 3a and 3b jointly comprise a schematic diagram of my control system in a slightly modified form, using a floor selector, and wherein the elevator may be caused to reverse its movements at any point in the shaft when no calls for service at any further point have been set in operation;

Fig. 4 is a diagrammatic showing of a floor selector which may be used with the system shown in Figs. 3a and 3b.

Fig. 5 is a detail showing of a contact member which may be used with the floor selectors shown in Figs. 2, 3 or 4; and Fig. 6 is a detail showing of another form of contact member which may be used with the system shown in Figs. 3a and 3b.

Figure 1:
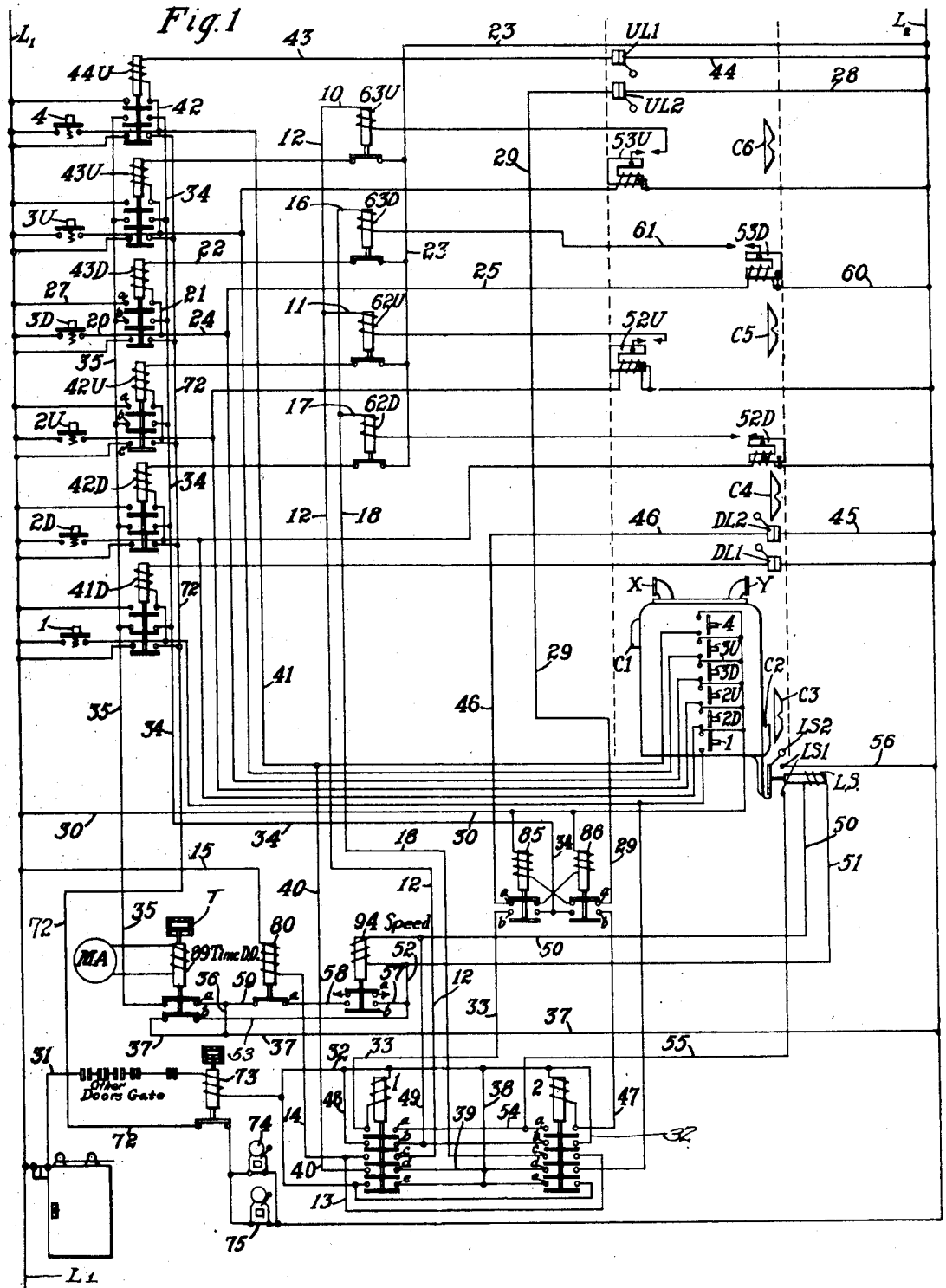

My invention will be described first with reference to Figure 1, wherein buttons 4, 3U, 3D, 2U, 2D and 1 are push-buttons located at the several floors served by the elevator and are manually operable by persons desiring to use the car. Push-button relays 44U, 43U, 43D, 42U, 42D and 41D are connected for actuation by their respective push-buttons and are provided with holding circuits closed by the operation of the associated relay. A set of floor relays 63U, 63D, 62U and 62D, provided with normally closed contact members, which are opened when the relay is energized, have their contact members connected in series relation with the coils of the associated push-button relays 43U, 43D, 42U and 42D, respectively.

An inductor relay 53U, with normally open contact members is connected in parallel relation to the push-button relay 43U. The contact members of this relay 53U, when closed, effect the energization of the coil of relay 63U, and similar inductor relays 53D, 52U and 52D are connected in like manner to relays 63D, 43D, 62U, 42U, 62D and 42D, respectively. The inductor relays are mounted in the elevator hatchway adjacent the respective floors, in such position that the operation of a relay will occur at such time as to bring the car to rest at the level of the associated floor. These relays may be of the type shown in the copending applications of John F. Clancy, Serial No. 559,997, filed May 11, 1922 and H. W. Williams, Serial No. 190,482, filed May 11, 1927. Inductor irons X and Y are shown mounted on the car and are so placed as to be positioned closely adjacent the inductor relays when the car arrives opposite such relays. Inductor iron X is arranged to complete the magnetic circuit of relays 52U and 53U and thus actuate the relay movable contact members, while inductor iron Y is arranged to perform a similar service for relays 52D and 53D as the car moves in its shaft.

The circuit through the coil of relay 44U leads through a normally closed switch $UL_1$, which may be of the usual limit switch type operated by a cam $C_1$ on the car when the car approaches its upper limit of travel. A switch $DL_1$ is connected in like manner to the coil of relay 41D for operation by the car at the lower limit of travel.

The circuits to relays 63U and 62U are connected by conductors 10 and 11 to a conductor 12 which leads through a set of contact members $c$, on "up" motor-controlling relay 1 which are closed only when the coil of this switch 1 is energized to cause the car to move upwardly. From the contact members $c$ on up switch 1, the circuit continues by conductor 14 to the coil of a relay 80 and by conductor 15 to one side $L_1$ of the source of energy. The circuits for the coils of relays 63D and 62D lead by way of conductors 16, 17 and 18 to contact members $c$ of "down" motor-controlling relay 2 which are closed when the coil of this relay is energized to move the car downwardly, whence the circuit continues by way of conductors 13 and 14, coil 80, and conductor 15 to the line conductor $L_1$.

A series of buttons 4, 3U, 3D, 2U, 2D and 1 are mounted on the car for operation by passengers within the car, and are respectively connected in parallel relation to the floor push-buttons 4, 3U, 3D, etc.

A pair of direction-determining switches 85 and 86 are provided for causing the elevator, when starting in one direction, to continue traveling in that direction until it arrives at the limit of travel for that direction. The relay 85 is designated as the "up" determining switch and has its coil in circuit with a switch $UL_2$, mounted for operation when the elevator car arrives at its upper limit of travel. The relay 86 is designated as the "down" direction-determining switch and has its coil connected in circuit with a switch $DL_2$ arranged for operation when the elevator car arrives at the lower limit of travel. The switches $UL_2$ and $DL_2$ may be of the usual limit switch type arranged at the upper and lower limits of travel, respectively, for actuation to open-circuit position by the cams C and $C_2$, respectively. The coils of relays 85 and 86 are mutually interlocked through normally closed contact members $a$ on each of these relays, the circuit for "up" direction-determining switch 85 extending from line conductor $L_1$, through conductor 30, the coil of relay 85, normally closed contact members $a$ of "down" direction-determining switch 86, conductor 29, switch $UL_2$ and conductor 28 to line conductor $L_2$. The circuit for "down" direction switch 86 extends from line conductor $L_1$ through conductor 30, the coil of "down" direction-determining switch 86, normally closed contact members $a$ of "up" direction determining switch 85, conductor 46, switch $DL_2$ and conductor 45 to line conductor $L_2$. By connecting the direction-determining switches 85 and 86 through the above described circuits, it will be seen that only one of these switches may be energized at any given position of the elevator car, since, when the car is at the lower limit of travel, switch $DL_2$ is open, rendering switch 86 inoperative and permitting switch $UL_2$, now closed, to complete the circuit for switch 85 through the contact members $a$ of switch 86. When the car leaves the lower limit of travel, the reclosing of switch $DL_2$ is prevented from re-energizing switch 86, since the circuit for this switch is now open at contact members $a$ of switch 85.

A landing switch LS is mounted on the car and comprises a coil which, when energized, closes a pair of contact members $LS_1$. The contact members $LS_1$ may also be closed by means of a roller $LS_2$ when in engagement with any one of the cams $C_3$, $C_4$, $C_5$, or $C_6$, which cams are located adjacent the first, second, third and fourth floors, respectively, in such positions that the car will be at rest at a level with the associated floor, when said roller has just moved into the notched portion of the cam. The hoisting motor MA, which moves the car up and down the shaft, has connected across its armature, the coil of a relay 89. This relay 89 is provided with means, such as a dashpot T or some other suitable device, for giving said relay a time-element release or dropout. A relay 94 may also be provided for causing the hoisting motor to increase in speed when said relay is energized, as by connecting and disconnecting a resistor in the hoisting motor armature circuit or by any other suitable speed-changing arrangement.

The operation of my system, as illustrated in Figure 1, is as follows:

Assuming a person to be on the third floor and desiring to travel to the first floor, he operates the down button 3D. This action effects the energization of the coil of relay 43D and the inductor relay 53D. The circuit for coil 43D extends from line conductor $L_1$ by way of conductor 20, button 3D, conductor 21, coil 43D, conductor 22, normally closed contact members of relay 63D, conductor 23 to the other side of the source of energy, namely line conductor $L_2$; and the circuit for relay 53D extends from line conductor $L_1$ through button 3D, conductor 20, conductors 24 and 25, coil 53D and conductor 26 to line conductor $L_2$. Relay 43D, now energized, closes a self-holding circuit by way of conductor 27 and contact members $a$ thereof, and also closes its contact members $b$ to complete a circuit to the "up" motor-controlling switch 1 as hereinafter described to start the car upwardly, if the car is below the third floor, or to the "down" motor-controlling switch 2, if the car is above the third floor. The motor-controlling switch that will be operated will be determined by the position of the car and by the operation of relay 85 or relay 86 in the following manner:

Assuming the car, at the instant the passenger operated the button 3D, to be standing at the first floor, switches $DL_2$ and $DL_1$ will remain open, while switches $UL_1$ and $UL_2$ will be closed. A circuit from line conductor $L_2$ by way of conductor 28, switch $UL_2$, conductor 29, normally closed contact members 86a of relay 86, coil 85, and conductor 30 to line conductor $L_1$, is completed. Relay 85 is thus energized and closes its contact members $b$.

Relay 85 closes a circuit to start the motor to move the car upwardly as follows: From line conductor $L_1$, by conductor 31, through door and gate contact members, (labeled "Door" and "Gate") the coil of relay 73, conductor 32, coil of switch 1, conductor 33, contact members $b$ of relay 85, conductor 34, contact members $b$ of relay 43D, conductor 35, normally closed contact members $a$ of relay 89, and conductors 36 and 37 to line conductor $L_2$. The hoisting motor is thus energized and the car starts upwardly.

When the car starts on an up trip, it is desirable that it should complete the up trip before reversing, as this is the usual practice with cars which are operated by an attendant. Pushbutton relay 44U is therefore caused to be energized every time the car starts upwardly. This result is accomplished by a circuit which leads from line conductor $L_1$, through conductors 31, 32, 38 and 39, contact members $d$ of up switch 1, conductors 40, 41, and 42, coil of relay 44U, wire conductor 43, switch UL₁ (which is closed since the car is below its upper limit of travel), and conductor 44, to line L₂.

As the car moves up the shaft, the inductor iron Y passes inductor relay 53D, which has been energized to cause the closure of its contact members. This action would allow current to flow through floor relay coil 63D, as previously stated, but the circuit therefor is open at contact members c of motor controlling switch 2 and the operation of inductor relay 53D is, therefore, not effective to stop the car while it is on its way upward. The car continues travelling upwardly until it reaches and operates switches UL₂ and UL₁. Switch UL₁ opens the circuit to relay 44U, and switch UL₂ opens the circuit to relay 85. Relay 85, being deenergized, opens the circuit to the "up" motor-controlling switch 1, and the car is brought to a stop at the top floor. Further, relay 85, when deenergized, closes its contact members a to complete the circuit to relay 86 as previously described.

Since the third floor "down" button 3D has been operated, relay 86 completes the circuit to the "down" motor-controlling switch 2 by way of line conductor L₁, conductor 31, door and gate switches, the coil of relay 73, conductor 32, the coil of the down switch 2, conductor 47, contact members b of relay 86, conductor 34, contact members b of relay 43D, conductor 35, contact members a of relay 89, and conductors 36 and 37 to line conductor L₂, and the car starts downwardly. As the car approaches the third floor on its way down, inductor iron Y again operates inductor relay 53D and closes the circuit to relay 63D; the circuit for which may now be completed, since contact members c of down switch 2 are closed. Relay 63D thus opens its contact members, deenergizing relay 43D thus restoring the call circuit to normal. The car, being on its way down, is now stopped, in response to the "down" call from the third floor, in the following manner:

The operation of either relay 1 or relay 2 completes parallel circuits to the coils of the landing switch LS and high "speed" relay 94 extending from line conductor L₁ through conductors 31, 32, contact members b of down switch 2, conductors 49 and 50, landing switch coil LS, conductors 51, 52 and 53, the normally closed contact members b of relay 89, and conductor 37 to line conductor L₂. The energization of the landing switch LS insures continuance of the operation of the motor by completing a holding circuit for the motor-controlling relay 1 or 2 which has been operated. The holding circuit for motor-controlling relay 2 extends from line conductor L₁, through conductor 31, door and gate switches, coil of relay 73, conductor 32, the coil of motor-controlling relay 2, contact members a of relay 2, conductors 54 and 55, contact members LS₁ of landing switch LS and conductor 56 to line conductor L₂. If "up" motor controlling relay 1 is energized, the holding circuit for this relay extends from line conductor L₁, through conductors 31 and 32, as traced for relay 2, the coil of motor-controlling relay 1, contact members a of relay 1, conductors 54 and 55, contact members LS₁ of the landing switch LS and conductor 56 of line conductor L₂.

By means of the circuit closed through the contact members of landing switch LS, the breaking of the relay circuit 43D, as described, does not, therefore, cause the immediate opening of the "down" motor-controlling switch 2.

When the motor starts it energizes relay 89, breaking the circuit to landing switch LS, but a by-pass for this switch is completed through the operation of relay 94 by way of conductor 57, contact members b of relay 94, conductor 58, contact members of relay 80, and conductors 59, 36, and 37 to line conductor L₂. Thus the circuit for the landing switch is transferred from relay 89 to relay 80, as soon as the car gets under way. When the inductor relay 53D is actuated it energizes the coil of relay 80 through conductor L₂ and 60, contact members of relay 53D, conductor 61, coil 63D, conductors 16 and 18, contact members c of down switch 2, conductors 13 and 14, coil 80 and conductor 15 to line conductor L₁. Contact members of relay 80 are thus opened to deenergize the coil LS, allowing the roller LS₂ to drop on cam C₃.

The cam C₃ extends from the point at which inductor relay 53D is located to the level of the floor. At the instant of the deenergization of the coil of landing switch LS, the car is opposite the cam C₃, and the roller LS₂ maintains the contact members LS₁ closed until the roller rides into the notch of the cam, thus permitting the contact members LS₁ to open and break the proper motor-controlling relay circuit to stop the car.

As may be readily seen, if a button had been operated at the second floor, or the fourth floor (or any floor) above the position of the car at the time such button was operated, a circuit to the corresponding push-button relay and inductor relay would have been completed and the car would have stopped in response to the operation of any "up" button as it moved upwardly to answer the third floor "down" call. This action may be understood from an inspection of Fig. 1.

Assuming button 2U to have been operated, relay 42U and inductor relay 52U will be energized by their respective circuits and as the car moves up the shaft, inductor iron X, as it is approached by inductor relay 52U will effect the closure of the contact members 52U, energizing relay 62U through the wires 11 and 12, contact members c on switch 1, (which is in circuit-closing position since the car is moving upward), and the car will be caused to stop, as before described, to take on the passenger at the second floor. The car is prevented from immediately restarting to answer the call from 3D by the operation of relay 89, as will presently be described. The passenger at the second floor opens the car shaft door and car gate when the car stops at the second floor, which places an additional break in the circuits for the motor-controlling relays and renders the car entirely inoperative until these doors and gate are again closed. This is a safety measure and merely prevents the car from moving while a passenger is getting on or off the car.

When the passenger has entered the car and closes the door, the circuits for the motor-controlling relays are reestablished through the door and gate switches and, by reason of the fact that the relay for the third floor is still energized, the car proceeds upwardly toward that floor. The passenger, now in the car, operates one of the car buttons, for example, the fourth floor button.

When the car stops at the fourth floor, it would immediately reverse and start downwardly were not some means provided to prevent such immediate reversal. One form of such means is shown in the relay 89 which, as described above, has a time element drop-out and, when the car stops, a short time elapses between the stopping of the car and the closure of contact members a of relay 89, which latter must be closed in order for the car to start in response to the operation of any button. This time lapse gives the person on the car time in which to open the door after the car has stopped at the floor. Of course, from the time that the door is opened, the car cannot be started until the door is again closed, by reason of the fact that the circuits for both the "up" and "down" switches 1 and 2 feed through switches (labeled "Door" and "Gate") which are respectively opened by the corresponding door and gate.

When the passenger has left the car and closed the door, the car immediately starts downwardly in response to the button 3D which has been operated, and the car is brought to a stop at the third floor, as previously described.

When the passenger at the third floor gets on, he operates a button on the car, for example, 1, to cause the car to take him to the first floor. The car then starts downwardly and may stop in response to any of the down buttons which have been operated at any time before the car arrives at the corresponding floor, when moving in the down direction, the operation being the same as that described for stopping at the second floor in response to the button 2U.

In view of the fact that holding circuits are provided for each of the push-button relays, a button once operated remains operative to call the car to the corresponding floor at all times until the car arrives at the floor after traveling in the direction corresponding to that for which the button was operated. It is thus seen that with my system, the car will operate exactly as though an operator were on the car. The car may be brought to any floor and may be stopped thereat when the car is on its way in the direction in which the passenger has indicated his intention to travel, by operation of the corresponding button, and the car may be stopped successively at each of the floors for which buttons have been operated at any time before the car arrives at the floor, when the car approaches the floor going in the desired direction. Thus, in my system the car will respond to any number of operated call devices, and will stop at the floors only when approaching the floors in the direction for which the call device has been operated.

In push-button controlled elevators with door and gate safety switches operating to prevent the car from moving while the doors are open, it becomes very inconvenient and annoying if persons using the car hold the doors open or forget to close the doors when they have finished using the car, since this prevents other persons from obtaining the services of the car. In order to avoid this I have shown a signal which may be mounted on the car and which will operate to call attention to the fact that one of the doors is open and someone wishes to use the car. This device comprises an additional contact member on each of the push-button relays 41D, 42D, 42U, etc., which connects line $L_1$ to a conductor 72 common to all of the relays. This conductor 72 leads through the normally closed contact members of a relay 73 and thence to a signal 74 (shown as a bell) on the car. In order to prevent the signal from operating except when the doors have remained open for a predetermined time, the relay 73 has its coil connected in the circuit for the door and gate switches and is provided with a dash-pot or other retarding means to retard the closing action of the relay. Thus, should one of the doors be opened, the relay 73 would be deenergized and would close its contact members a predetermined time thereafter. If, before the door was opened, a call had been registered, the closing of the contact members of relay 73 would immediately operate the signal. On the other hand, if the door has remained open sufficiently long for the contact members of relay 73 to close, and thereafter someone wishes to use the car, the operation of the push-button relay corresponding to the floor at which such person desires the service of the car, will immediately close the signal circuit, thus warning the person holding the door open that he should close the door. Additional signals, such as 75, may be provided, for example, in the office of the caretaker for the building, at the engineer's office or any place at which it is desirable to indicate that the elevator is not in condition to serve the passengers desiring to use the car. If desired, an annunciator (not shown) could be connected in circuit with the door switches in any well-known manner to indicate on the annunciator which of the doors is open and thus facilitate the restoring of the system to operative condition.

Figure 2:
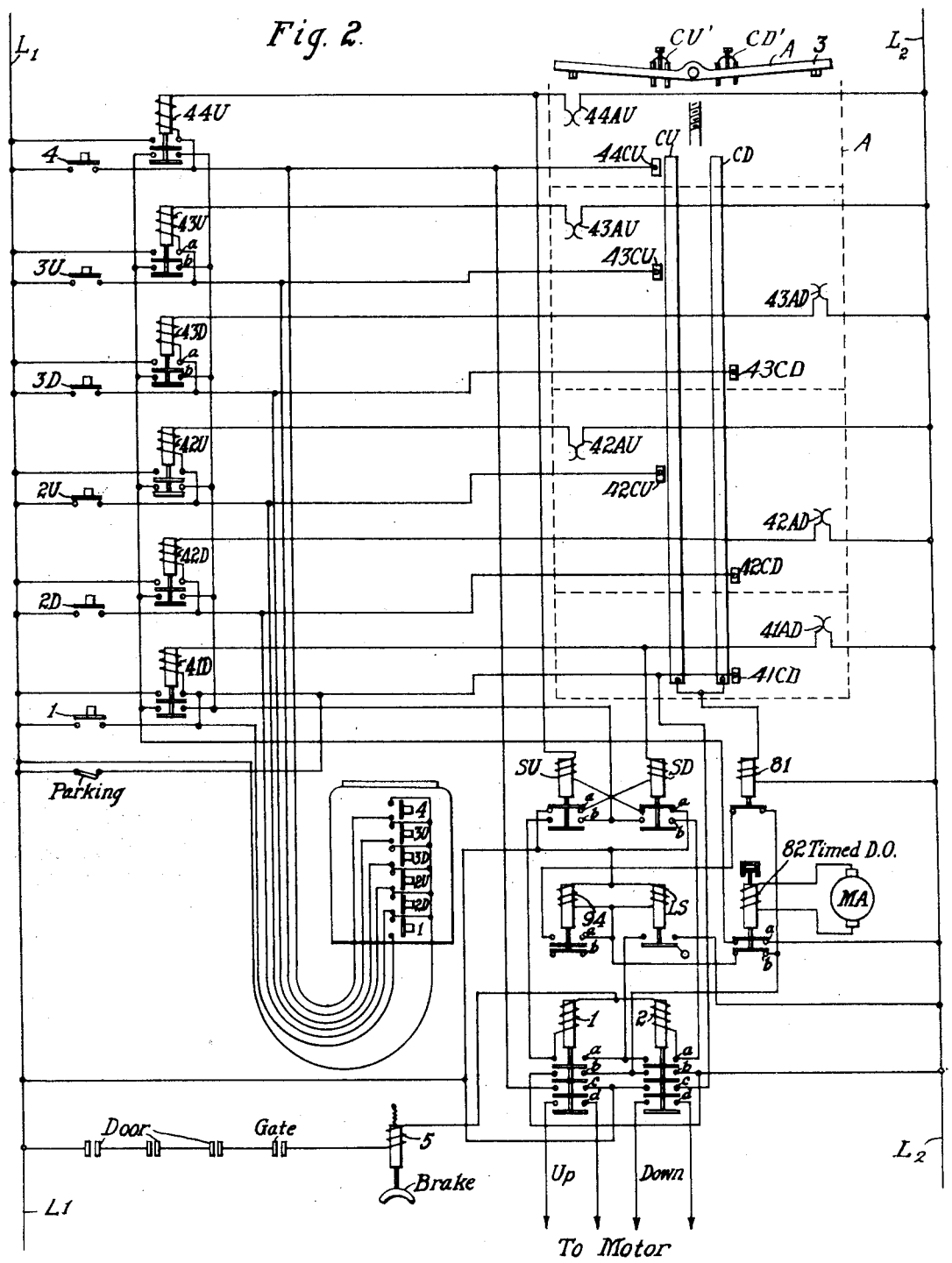

Figure 2 is a modification of the control system of Fig. 1, substituting a floor selector provided with a series of normally closed contact members 44AU, 43AU, etc., corresponding respectively to each of the push-button relays, which take the place of the relay contact members 63U, 63D, etc. of Fig. 1. The floor selector comprises a panel A on which are mounted the contact members 44AU, 43AU, 43AD, etc., a pair of contact strips CU and CD which extend substantially the full length of the panel, and a series of contact segments 44CU, 43CU, 43CD, 42CU, 42CD, and 41CD. An arm $A^1$ is moved over the panel in correspondence with the movements of the car up and down the shaft, by means of a screw or any other suitable means such as those commonly used to operate floor selectors or commutators for elevator signalling systems. These devices usually rely on the frictional engagement between the movable arm and the screw to shift the arm into engagement with one set of contact members when the car is moving upwardly and the other when the car is moving downwardly.

The contact members 44AU, 44CU, etc., are arranged on the panel in such positions that the arm $A^1$ is adjacent to these contact members only when the car is in a corresponding position with reference to the associated floor. Wedge-shaped pieces AU and AD of any suitable insulating material are employed to pass between and separate the contact members 44AU or 44AD, respectively, to thereby interrupt the circuit therethrough as shown in Fig. 6. A pair of brushes $CU^1$ and $CD^1$ bridge the contact members CU or CD, respectively, when the car is moving up or down, as the arm passes over the panel and the car is adjacent the corresponding floor.

The contact members 44AU, 43AU, etc. will be opened when the car arrives at the associated floor, breaking the circuit through the coil of relays 44U, 43U, etc. respectively, and permitting the armature of the corresponding coil to be released, thus breaking the operating circuit for the up and down motor controlling switches, respectively, as described for Fig. 1. The contact members 41CD, 42CD, 42CU, etc. when bridged by the brushes $CU^1$, $CD^1$, operate a relay 81 to open the speed switch 94 and release the landing switch LS when the car arrives at a predetermined distance from the corresponding floor for which a button has been operated. The slow-down and stopping of the car are performed in the same manner as was described with reference to Figure 1.

A relay 82, the coil of which is connected across the hoisting motor armature, is provided with means giving it a time-element drop out, and functions in the same manner as relay 89, shown in Fig. 1. Two relays SU and SD are shown respectively connected to contact members 44AU and 41AD, and serve the same purpose as relays 85 and 86 of Fig. 1.

A circuit controlled by a knife-switch (labeled "Parking") is shown connected to first floor relay 41D Fig. 2. This switch may be closed to cause this first floor relay to be constantly energized and thus cause the car to return to the first floor whenever no calls for service exist elsewhere. Obviously, this may be used for any floor at which it is desired to have the car "park".

Figure 3A:
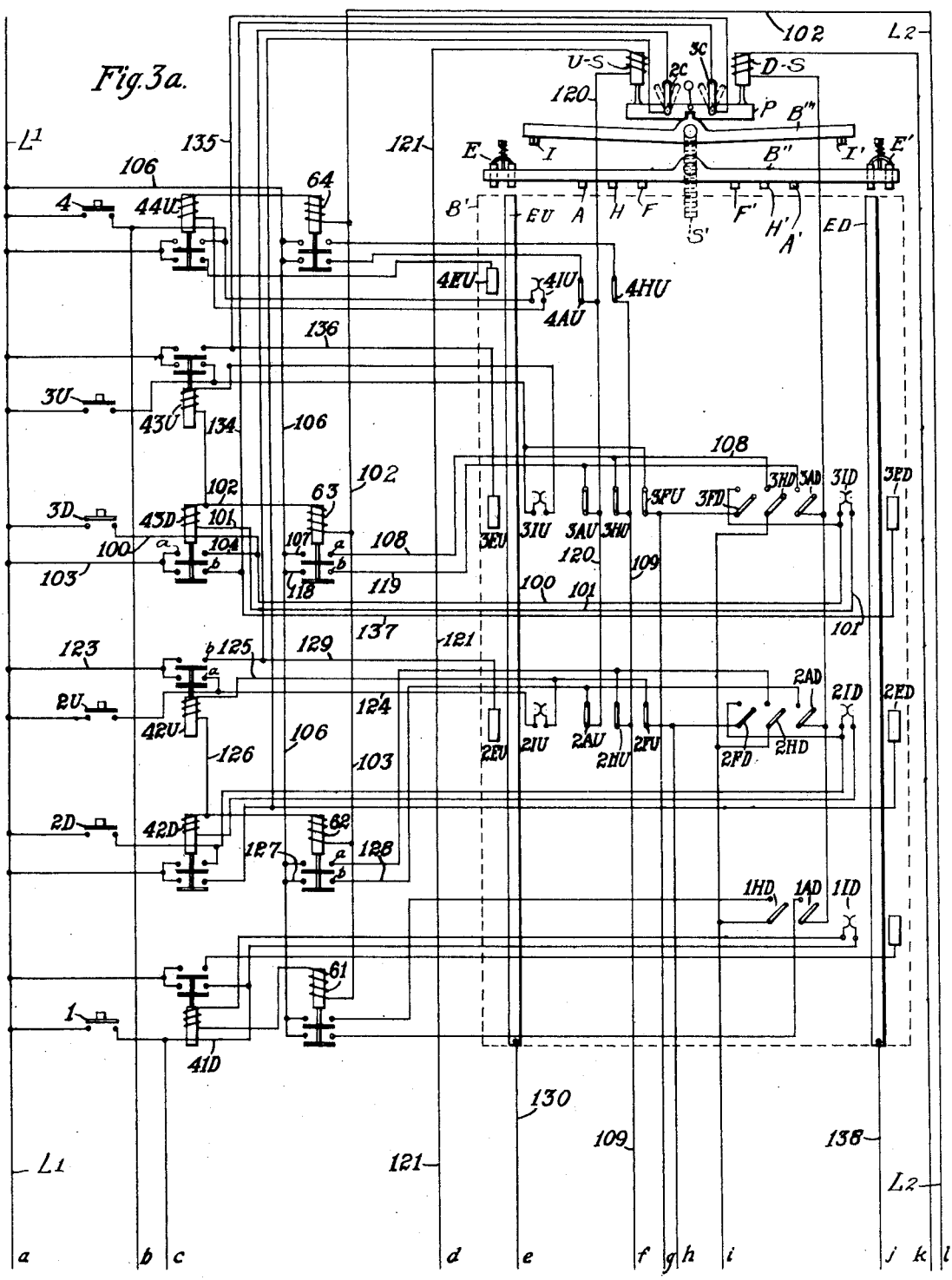

In Figs. 3a and 3b I have shown a modified form of my control system wherein the car is not required to travel over its full path, but may reverse at any floor when no calls exist for service at any point further in the direction in which it approached such floor, just as a car provided with an operator may be reversed at any point when there are no passengers requiring service at further floors beyond.

In this system, floor push-buttons 4, 3U, 3D, 2U, 2D and 1 are provided, as in Fig. 1, to be operated at the floors, to call the car for travel in the corresponding direction. Push-button relays 44U, 43U, 43D, 42U, 42D and 41D are also provided, corresponding to similar relays shown in Fig. 1. A floor relay 63 is connected to the coils of both relays 43U and 43D, and floor relay 62 is connected to the coils of both relays 42U and 42D. A floor relay 61 is connected to the coil of relay 41D, and a floor relay 64 is connected to relay 44U.

A floor selector similar to that shown in Fig. 2 is shown for use with this system and may comprise a panel B' and two arms B'' and B''', which are moved by means of a screw S to travel over the panel in correspondence with movements of the car in its shaft. A series of trip switches 3FU, 2FU, 3FD and 2FD, such as are illustrated in Fig. 5, are mounted on the panel for engagement by tripping members F and F', respectively, which are mounted on arm B''. Another series of trip switches 4HU, 3HU, and 2HU are mounted for tripping engagement by a trip H mounted on the arm B''. A third series of switches 4AU, 3AU and 2AU are mounted for tripping engagement by a trip A carried on arm B''. A pair of brushes mounted on each end of arm B'' bridge the gap between a contact strip and contact segments EU and ED, respectively, as the car approaches the slow-down point for the corresponding floors. A series of similar switches engageable by additional trips H' and A' are provided on the other side of the panel for "down" control. The arm B''' carries at one end a wedge-shaped piece of insulation I that is engageable with a series of normally closed contact members 4IU, 3IU, etc. The other end of the arm B''' carries a similar insulating member I' for engagement with a series of contact members 3ID, etc. The arm B''' is loosely mounted on the screw S, permitting a rocking movement of the arm to allow insulator I to engage its contact members or to permit the insulator I' to engage its sets of contact members, and is normally held by means of springs S (Fig. 4) in a neutral position wherein neither set is engaged. A lever P, pivoted at O, rocks the arm to engage the down contact members when the "down" selector coil DS is energized, and "up" selector US operates in a similar manner to cause engagement of the "up" contact members of the arm B'''.

The contact members 3AU, 3HU, and 3FU may be of any suitable type in which the contact will be interrupted when the car passes in one direction and will remain open until the car passes in the other direction, one form of which is shown in Fig. 5, wherein a contact member K, having two arms L and M extending at right angles to each other, is pivoted to the panel as at N. Each of the arms carries at its outer end a tip of insulating material L' and M', respectively, for engagement with the associated tripping member A, H, or F, of arm B''. A contact member Q is mounted on the panel for engagement by a contact member Q' carried by the contact arm M. A spring R is shown so arranged that when the contact member K is moved to either of its positions by a tripping member, the member will remain in this position until again struck by the tripping member to move it in the other position.

The circuits in this figure will be traced in connection with the description of the operation. Assuming the car to be at the first floor, all of the switches AU, HU and FU are in circuit-closing position and all of the switches AD, HD and FD are in open-circuit position. Assume further that a passenger operates button 3D at the third floor to call the car to that floor to take him downwardly. The operation of button 3D energizes relay 43D by way of the following circuit: line conductor L₁, button 3D, conductor 100, contact members 3ID, conductor 101, relay 43D, coil 63, and conductor 102 to line conductor L₂. Relay 43D establishes a self-holding circuit extending from line conductor L₁, through conductor 103, contact members $a$ of relay 43D, conductors 104 and 100, contact members 3ID, wire 101, coil 43D, and coil 63 to line conductor L₂. Relay 63, now energized, closes a circuit by way of line conductor L₁, conductor 106, conductor 107, contact members $a$ of relay 63, conductor 108, switch 3HU, conductors 109 and 110, normally closed contact members $a$ of relay 80D, coil of relay 80U, and conductor 111 to line conductor L₂. This action effects the energization of relay 80U, which closes its contact members $d$ and operates the "up" motor-controlling switch 1 by way of line conductor L₁, conductor 112, the illustrated safety, gate and door contact members, brake relay 5, conductor 113, coil of relay 1, conductor 114, contact members $d$ of relay 80U, conductor 115, contact members $b$ of relay 82, conductors 116, and 117 to line conductor L₂. The motor then starts and moves the car upwardly toward the third floor.

The relay 63 also closes a circuit from line conductor L₁, through conductors 106 and 118, contact members $b$ of relay 63, conductor 119, switch 3AU, conductor 120, the "up" selector coil US, conductor 121, contact members $b$ of relay 80U, and conductors 122 and 111 to line conductor L₂. This circuit effects the rocking of arm B''' to permit the insulator I to engage its contact members IU as the car moves upwardly toward the third floor.

The car may stop on its way to the third floor to take on passengers at intermediate floors as follows: Assume that before the car arrives at the second floor a person operates the button 2U to call the car to the second floor for travel upwardly. This action effects the operation or relays 42U and 62, and closes a holding circuit for these relays through conductor 123, contact members a of relay 42U, conductor 124, normally closed contact members 2IU, conductor 125 to coil 42U, conductor 126, coil or relay 62 and conductor 102, to line conductor $L_2$. Relay 62 closes a circuit from line conductor $L_1$, through conductors 106 and 127, contact members b of relay 62, conductor 128, switch 2AU, conductor 120, through the "up" selector coil US, conductor 121, contact members b of relay 80U and conductors 122 and 111 to line conductor $L_2$. Since the "up" selector circuit is already closed, this latter circuit causes no change of operating conditions for the car.

Relay 42U prepares a circuit by way of line conductor $L_1$, conductor 123, contact members b of relay 42U, conductor 129, contact member 2EU, which circuit is open between contact member 2EU and the contact strip EU. As the car approaches the second floor, brush E completes this circuit through contact member 2EU, strip EU, conductor 130, contact members c of relay 80U, conductor 131, coil 81, and conductor 117 to line conductor $L_2$. Relay 81 opens its contact members, deenergizing speed relay 94 and the landing switch coil LS, and thus causes the car to slow down. (Note that relay 82 has been energized by counter E. M. F. of hoisting motor MA.) Landing switch LS operates as in Figure 1 to open the holding circuit for the motor-controlling switch 1 or 2, depending upon which is in operation, to stop the car accurately at the floor level. The approach of the car to the second floor opens contact members 2IU, breaking the holding circuit for relays 42U and 62 and restoring these relays to their normal inoperative positions.

A relay 82, connected across the hoisting motor armature by wires 132 and 133, and having a time element drop-out, performs the same function in this system as in the system of Fig. 1, that of allowing time for the passenger at the second floor to open the door before the car proceeds to answer the call at the third floor. When the passenger gets on the car and closes the door, the relay 1 again closes and the car starts upwardly. This circuit may be traced as follows: from line conductor $L_1$ through conductor 112, the illustrated door and gate switches, coil 5, conductor 113, coil of relay 1, conductor 114, contact members d of relay 80U, conductor 115, contact members b of relay 82, and conductors 116 and 117 to line conductor $L_2$.

The passenger who entered from the second floor now operates the button on the car for the floor to which he desires to travel, for example, the fourth floor button. This energizes relays 44D and 64 through contact members 4IU. The car thus continues upwardly until it approaches the third floor. At this instant, the "up" selector US is maintained energized through the closed contact members of relay 64 and normally closed contact member 4AU on the floor selector, and the effect of this action is to prevent the car stopping at the third floor in response to the down call. A pair of switches 2C and 3C are shown mounted upon the lever P, so arranged that they close their respective contact members only at such times as the floor selector is in neutral position. Since the "up" selector coil has been energized, the switch 3C has assumed the position indicated in dotted lines to the right of the switch 3C. No circuit is, therefore, completed to relay 81 when brushes E bridge the contact members 3EU, and thus the car continues on past the third floor to answer the fourth floor call.

The switches 2C and 3C are provided to operate under the condition described as follows: Had there been no call for service in a further direction beyond the third floor, the switch 3AU, opened as the car approached the third floor and prior to the closing of contact members 3EU (see Fig. 5), would have broken the circuit to the "up" selector coil US and permitted the floor selector to have assumed a neutral position, thus closing the contact members 3C and permitting contact members 3EU, when closed, to energize the relay 81 by the following circuit: line conductor $L_1$, through contact members b of relay 43D, conductor 134, switch 3C, conductors 135 and 136, contact members 3EU, conductor 130, contact members c of relay 80U, conductor 131, relay 81, and conductor 117 to line conductor $L_2$. Thus the car would have stopped in response to a down call button, even though the car is travelling upwardly when it arrives at the floor.

In the assumed operation, however, the fourth floor call, initiated by the passenger on the car, maintains the "up" selector US energized through the contact members 64 and the contact members 4AU, and thus the above-described operation is prevented.

The car approaches the fourth floor and the contact members 4EU are closed, the contact members 4IU are opened, and the car is stopped at this floor through the consequent energization of coil 81, as for the stops previously described. The passenger opens the door, gets off and recloses the door.

As the car approaches the fourth floor, the switch 4AU is opened by its associated tripping member and the circuit to the "up" selector coil US is deenergized, switch 4HU is opened and relay 80U is thus deenergized.

The third floor push-button relay 63, having been maintained energized during all of the preceding operations, supplies current to switch 3HU and energizes relay 80D, which in turn energizes the "down" motor switch 2, and the car starts downwardly. At the same time, relay 63 supplies current to switch 3AD and to the "down" selector coil DS through the contact members b of relay 80D. The car continues downwardly until the contact members E' of the floor selector arm B'' bridge contact members 3ED, thus energizing relay 81 by a circuit leading from line conductor $L_1$, through conductor 103, contact members b of relay 43D, conductor 137, contact members 3ED, conductor 138, contact members c of relay 80D, conductor 131, coil 81 and conductor 117 to line conductor $L_2$, thus causing the car to slow down and stop at the third floor.

The passenger at the third floor, desiring to travel downwardly, gets on the car and closes the door. Suppose that just prior to the time at which the car stopped at the third floor, a person at the fourth floor had operated the button at that floor to call the car. When the passenger closed the door, the car would be in condition to immediately respond to the fourth floor button (since this is now the only button which is in operative condition). To have the car immediately start up to answer the fourth floor call would be extremely annoying to the passenger who has just entered the car with the desire to travel downwardly and this action is prevented in my system by the provision of a relay 84. This relay has a time drop-out as described for relay 82 and the circuit for this relay is normally completed, when the door is opened, by way of line conductor L1, conductors 127, 135 and 140, contact members of relay 83, conductor 141, relay 84, and conductor 117 to line conductor L2. The relay 83 being connected by wire 134 in circuit with the door and gate switches, is normally energized when the door and gate switches are closed, thus breaking the normal circuit through the relay 84.

In this manner, when the passenger entering at the third floor closes the door and gate switches, the relay 84 is deenergized and releases its contact members only after a predetermined time interval has elapsed. The holding circuit for relay 80D leads through the contact members of relay 84 and until relay 80D is deenergized, the call for the upper floor is ineffective to control the car.

During the time allowed by the relay 84, the passenger on the car has an opportunity to operate one of the car buttons for the floor to which he desires to travel, for example, the second floor button. The car thus travels to the second floor and stops there, as previously described.

Another feature of my invention is in permitting the car to reverse its direction of travel at any point when no calls for service at points further in the direction in which it has been travelling are made. This action is provided for by the operation of relay 84. In the assumed operation, a fourth floor call exists at the time that the passenger who entered at the third floor leaves the car at the second floor, and after this passenger has closed the door, the relay 84 releases its contact members after the predetermined time interval and allows the relay 80D to be deenergized. The relay 80U now closes and the car starts upwardly.

This time allowed by the relay 84 may be termed a direction preference feature in that it allows calls for service in the direction in which the elevator has been travelling to supersede calls for service in the opposite direction. This result has been explained in the description of the operation at the time the person at the third floor entered the car and may be further illustrated by supposing the possibility of a first floor call being initiated during the time lapse between the closing of the doors when the passenger left the car at the second floor and the release of the relay contact members 84. The incoming call for the first floor, being initiated before relay 84 drops out, is completed at a time when relay 80D is still energized and this call takes preference over the fourth floor call.

This latter operation is identical with the operation of a car by an attendant on the car. Having arrived at the second floor after downward travel, an attendant would answer a first floor call before reversing the car to bring a passenger down from the fourth floor. Thus it is readily seen that my system performs automatically the same functions that are performed by an elevator operated by an attendant on the car in response to the usual elevator signals.

It will be further observed that, during the time the car is opposite any floor, the floor selector switches for that floor are in such position as to render the call buttons at that floor temporarily inoperative. Hence, should a passenger, desiring to board the car, failing to observe that the car was standing at that floor, operate a call button no movement of the elevator would be caused. This feature of my invention is of importance since it would be very undesirable that such accidental operation of a call button should cause the car to immediately start, making the passenger wait until it had completed a full round trip before he could board the car.

The foregoing description is illustrative only and I do not desire to limit myself to any of the specific mechanisms described herein, except as defined and limited by the appended claims. The use of inductor relays or floor selectors is obviously interchangeable and I may use either for any of the systems. The precise design and construction of the floor selectors is not material, the only requirement being that the floor selector must have contact members which may be normally closed and may be opened as the car passes the various floors, and other contact members which are normally open and which will be closed when the car passes the floors. Any type of landing switch may be substituted for the landing switch shown. The motor connections are illustrated, for the sake of simplicity, only in Fig. 3, and this showing is illustrative only, since my control system may be applied to other forms of motor-controlling means, for example, the system using motor-generator-motor-sets of the well-known Ward-Leonard type.

My control system, while shown as applied to a single elevator, is obviously capable of application to a group of elevators without change in the essentials of the system.

I claim as my invention:

1. In a control system for an elevator serving a plurality of floors, a car, a motor for driving said car, an up motor switch for causing said car to move upwardly, a down motor switch for causing said car to move downwardly, a car calling relay for each floor for causing the car to move to the corresponding floor for movement in an up direction, a car calling relay for each floor for causing said car to move to the corresponding floor for movement in a down direction, normally opened circuits for said relays, an up switch and a down switch at each floor for closing the circuit to the corresponding calling relay, a holding circuit for each of said relays, and means operated by operation of each relay for closing the associated holding circuit, a floor relay for each floor for causing said car to move to said floor, means operable by the operation of either of the calling relays for actuating said floor relay, a switch for each floor normally closed when said car is below the corresponding floor in circuit with said floor relay for closing said up motor switch, a switch for each floor normally closed when said car is above the corresponding floor for closing said down motor switch, means operable by movement of said car for reversing said switches as the car arrives at the associated floor from either direction, a normally closed stopping switch in circuit with each of said holding circuits, means for opening the normally closed switch for each holding circuit when said car arrives at the corresponding floor, means operated in response to the operation of said up motor switch for rendering effective only the means for opening the holding circuits for said up relays and to the operation of said down motor switch for rendering effective only said means for opening said down relay holding circuits, and manually operable means on said car for operating the car calling relay for each floor dependent upon the position of the car with respect to the floor when said means is operated.

2. In an elevator system, a car operable in a shaft, passenger-controlled means operable to control said car, doors for said shaft, means for rendering said passenger-controlled means inoperative to control said car when a door is open, and means operable responsive to the operated condition of said passenger-controlled means, for giving a signal, when said door remains open for a predetermined time.

3. In an elevator system, a car operable in a shaft, passenger-controlled means operable to control said car, doors for said shaft, means for rendering said passenger-controlled means inoperative to control said car when a door is open, and means responsive to the combined operation of opening said door and the operated condition of said passenger-controlled means for giving a signal at a predetermined time after said door is opened.

4. In a floor selector for elevator control, a base member, a member movable over said base, a series of alined up switches engageable and operable by said movable member and spaced over said base in the direction of movement of said movable member, a series of alined down switches engageable and operable by said movable member and spaced on said base in the direction of movement of said base, an additional series of up switches and an additional series of down switches also engageable and operable by said movable member and similarly spaced on said base, means for moving said movable member over said base in correspondence with movements of the elevator, means normally preventing engagement of said movable member with either the up or down additional series of switches, and means responsive to the direction of travel of said elevator for causing the movable member to engage the corresponding additional series of switches.

5. In an elevator-control system, a car operable between a plurality of floors, means for calling said car to a floor for up travel, means for calling said car to a floor for down travel, means operated upon the actuation of any call means above the car for causing said car to travel to the upper terminal, and means for stopping said car when moving upwardly at any number of floors for which up call means have been operated between the operation of said first call means and the arrival of said car at the upper terminal floor, and means operably responsive to the presence of said car at any floor for rendering the call means for said floor ineffective to cause movement of said car.

6. In an elevator-control system, a car operable past a plurality of floors between two terminals, call means for dispatching said car to each of said floors, means operable by movement of said car toward any operated call means for causing said car to continue travelling to the terminal corresponding to the direction in which the car must travel to said operated call means, and means operably responsive to the presence of said car at any floor for rendering the call means for said floor ineffective to cause movement of said car.

7. A control system for an elevator car comprising a floor-relay switch for each of a plurality of landings, each operable to maintain itself in actuated position electrically, circuits responsive to said floor-relay switches effective to start the car, additional circuits responsive to said floor-relay switches effective to stop the car, a fixed contactor for each landing in its associated stop circuit, and a contactor common to said fixed contactors, movable in accordance with the car successively to engage said fixed contactors.

8. In a control system for an elevator car operable past a plurality of floors between two terminal floors, a control for each of said floors; and car starting and stopping mechanism including means disposed to respond to operation of any of said controls to cause said car to move to and stop at the corresponding floor, means to prevent reversal of said car except at terminal floors, and means effective while said car is standing at any floor for rendering the control for that floor ineffective to cause said car to start.

9. In a control system for an elevator car operable past a plurality of floors intermediate two terminal floors, an up control and a down control for each of said intermediate floors and a control for each of said terminal floors; and car starting and stopping mechanism including means disposed to respond to operation of any of said controls to start said car, direction determining means effective to prevent reversal of said car except at said terminal floors, means responsive to said controls for stopping said car successively at floors for which controls for the corresponding direction are operated, said mechanism including floor selector mechanism effective while said car is standing at a floor to render a control for such floor ineffective to cause said car to start.

FRANK E. LEWIS.